June 15, 1965 P. A. HERSCH 3,188,854
GAS SAMPLING MEANS
Filed March 1, 1961

INVENTOR
Paul A. Hersch

3,188,854
GAS SAMPLING MEANS
Paul A. Hersch, 406 W. Valencia Drive,
Fullerton, Calif.
Filed Mar. 1, 1961, Ser. No. 92,690
Claims priority, application Great Britain, Mar. 7, 1960, 8,016/60
13 Claims. (Cl. 73—23)

The present invention relates as indicated to a means for taking gas samples.

There are many circumstances when analyzing an atmosphere or a gas stream that more accurate results can be obtained by the use of very small quantities of the gas or gases to be analyzed. By continuously transferring a very small volume of the sample into a carrier system, free of the constituent to be analyzed, it is possible to use trace analysis techniques which result in a saving of time and materials. Still further, such techniques takes advantage of apparatus which without dilution of the sample would become overloaded and unstable or would give a non-linear or flat response curve.

It is therefore the principal object of this invention to provide a dilution technique which is reliable and flexible and which does not introduce any time lags in response when continuously analyzing gas samples.

Other objects will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the many ways in which the principle of the invention may be employed.

The present invention provides for a continuous bleed of one gas into another at a minute rate under strict control. With the present invention the sample gas and the carrier gas or diluting gas may both be static or both flowing, or one may be static and the other flowing. According to the invention, the gas to be analyzed is diffused through a very narrow, short bleed channel or a plurality of such channels into a carrier gas, under a differential of partial pressure, which differential of partial pressure is of course caused by the fact that the carrier gas does not contain any of the material which is to be analyzed. The present invention does not use a diffusion membrane whereby the sample gas is diffused into the carrier gas. When the sample to be analyzed has to be absorbed into a membranous barrier, to traverse it by diffusion within a solid and to be released eventually, the time required to set up a steady state of transfer can be appreciable. In the present invention the sample gas and carrier gas or diluting gas communicate directly and this time lag is substantially eliminated.

For ease in describing the present invention I shall call the original sample gas mixture "S," the constituent of S which is to be determined will be called "X," the diluent carrier gas into which X is transferred from S will be referred to as "C," the bleed channel or channels through which X bleeds from S into C will be "L," and the analyzing device is "E."

In all embodiments of this invention, in the absence of a gradient of total pressure between S and C but presence of a gradient of partial pressure between S and C with respect to X, X will diffuse from S into C. Constituents of S other than X will also diffuse into C if, with respect to these other constituents, a gradient of partial pressure exists. However, the sensor E (in conjunction where necessary with a special absorber) is so chosen that it is sensitive to X only, ignoring other species. The slightest positive gradient of total pressure between S and C would cause an additional transfer of X (with all other components of S) into C, by flow, which normally is unnecessary and undesirable and care must be taken to keep the total pressures on the two sides of the channel equal. However, when the concentration of X in S is low, a flow of S into C adds usefully to the ingress of X by diffusion. Conversely, if S is very rich in X, it is advantageous to mitigate the transfer of X into C by a counter-flow of C into S under a differential of total pressure opposing the differential of partial pressure. It is important to note that if a difference of total pressure is applied it must be kept constant. The differential, which rarely needs to be as high as 20 mm. Hg, may be created and controlled by a flow throttle inserted into either C or S, if C or S are flowing.

The bleed channel or channels for the transfer of gas X must be extremely narrow to keep the diffusion steady and it must also be short to ensure fast equilibration. It must not, however, be infinitely short, i.e., it must not degenerate into an orifice in an infinitely thin wall.

The cross section of the bleed channel must be less than about 0.01 square millimeter in area and can go down in width to the order of molecular dimensions and should be from about 0.01 mm. to about 5 mm. in length. Where a bleed channel is used which comprises more than one channel, each one of the several channels must individually have a cross section of less than about 0.01 square millimeter in area; it being important, however, that the bleed channel opening is no more than about .01 mm. in area. It is immaterial to the present invention whether the opening of the channel is round, square, a slit, or any other shape as long as its cross section and length are in the stated range. Using such a bleed channel I obtain an instantaneous dilution with no time lag of from about 1:5,000 to about 1:500,000.

Very often the material for separating S from C will be glass. A bleed channel of suitable width may then be made through the glass wall by high voltage sparking with a leak-hunting probe as used in vacuum work. Another method is to fuse through the glass a thin wire with a larger coefficient of expansion than the glass, so that on cooling an annular crevice opens up between the glass and the wire. Thus, with an 0.25 mm. dia. platinum wire fused through 1 mm. thick borosilicate glass a crevice can be obtained because of the difference in thermal expansion between the glass and the platinum wire, which will admit about 0.1 cu. mm. oxygen/minute from air into nitrogen if both the air and the nitrogen are at 1 atm. total pressure. If the wall between S and C is of metal, similar gaps can be provided by inserts of material with a different thermal expansion.

After the unknown X has entered the carrier gas C through the bleed channel L, X must be brought to a sensing element, E, to produce a signal. The transport of X to E within C can be effected by diffusion alone, or by diffusion aided by convection, or by a flow of C from L to E. Often E will represent a "sink" for X, i.e., a steady state is attainable in which as much X is absorbed or destroyed by E as enters C through L. In this case C can be static, and to hasten the attainment of equilibrium the diffusion path from L to E should be as short as possible, i.e., E should fill the major portion of its housing leaving only a narrow gap for C. The volume of C can, however, be appreciable if means are provided to create convection or turbulence around E, e.g., by encasing with E a turbine operated from the outside through induction.

C can be a continuous gas stream carrying X from L to E and thence flowing to waste. In this case there is no need for X to be totally consumed in the process of evoking a signal from E. Instead of going to waste, the out-going C can be returned to L in a loop, using a pump. Before returning, C must be stripped of any residual X, e.g., by passing through an absorber destroying or retaining all X.

To ensure equal total pressure on either side of the channel, S and C can be made to communicate through a generally U-shaped tube having a flat horizontal base containing in its horizontal part a drop of a liquid. If C is in a confined space a minor expansion or contraction due to changes in temperature will not create a pressure differential but merely move the slug of liquid. Larger fluctuations of volume may be corrected by a vent, e.g., a U-tube with a small volume of liquid in its lowest part forming a mobile seal, or by a long very fine capillary. Between C and its vent an absorbent for X may be inserted, so that if some S penetrates into C through the vent no X is introduced.

Instead of one single channel or crevice, several may be used, the choice depending on the concentration of X in S and on the sensitivity of E. In extreme cases a small window of a thin porous material, with a multitude of channels, may be employed. Care must be taken that the channel or channels are not blocked by dust or condensing moisture.

One important application of the above technique is the monitoring of oxygen in the atmosphere of mines, manholes, oxygen tents, incubators, respiratory masks, aircraft, etc. Very simple electrochemical analyzers for trace oxygen have recently become available. The present invention provides means for extending their applicability to the high oxygen contents of respiratory atmosphere. For example, one trace analyzer for oxygen consists of a galvanic system comprising a porous inert polymer sheet of plastic soaked with caustic solution and lined on one side with a noble metal and on the other with a base metal. This analyzer E may be confined in a close-fitting Pyrex glass envelope in an atmosphere of nitrogen. Fluctuations of temperature are prevented from causing a pressure differential by a slug of liquid, e.g., dibutylphthalate, in a horizontal semi-capillary tube. At a point facing approximately the center of the noble metal surface of E, the Pyrex wall possesses a channel—the gap opening up after a "bristle" of 0.25 mm. dia. platinum wire has been fused through the wall. The envelope is simply placed into the atmosphere to be analyzed, or a sample of it may be continuously aspirated by a pump so as to flow past the outer aperture of the channel. To avoid condensation of moisture the region of the channel may be kept slightly above room or body temperature by a simple heater.

A similar arrangement can be used for monitoring oxygen in flue gas. The range of concentration to be measured there is lower than in respiratory atmospheres, requiring a wider channel, or several channels, or more sensitive metering of the electrical current signal of the analyzer. Moisture and dust in the sample gas must be avoided by conventional means.

The systems disclosed in this specification may also be used in cases where no direct analyzer E is available for X. X may then be carried by C from L to a reaction chamber R in which it produces an equivalent amount of a chemical substance capable of affecting E. Alternatively, X can be made to consume a reagent to which E is sensitive so that an increase of X results in a decrease of the signal. C, carrying X to R, also carries the product or residual reagent from R to E. After purification C may be pumped back to L. The reagent, if a gas, may be added to C by a second channel, L', or L may be used for both X and the reagent.

An example for the first case is the continuous analysis of carbon monoxide in producer gas. The carbon monoxide is made to bleed into a stream of nitrogen, at a rate proportional to the concentration of CO in the sample. The nitrogen carries the CO aliquot through a bed of iodine pentoxide kept at 120° C. There CO reduces $I_2O_5$ to iodine, a well known and often used reaction. The iodine is carried to an amperometric analyzer. The nitrogen leaving this analyzer is scrubbed by thiosulfate solution and pumped back to the leakage channel to receive fresh CO and recommence its cycle.

An example for the second case is the monitoring of combustible gases in air, e.g., methane in mine air, or hydrogen in battery rooms. Both the combustible gases and oxygen are bled into a stream of nitrogen and then carried to a combustion chamber (with heated platinum) and finally to an electrochemical element indicating the oxygen left over after combustion. The nitrogen may then be freed from the oxygen not taken up electrochemically and returned to the bleed channel to pick up against combustible gas and oxygen. Where the oxygen greatly exceeds the combustile gas in the sample, the accuracy is naturally low. As a remedy, the oxygen diffusing into the carrier may be retained in a selective absorber and the nitrogen provided instead with a smaller proportion of oxygen by a second, narrower leak L'. Instead of using L', a part of the total carrier stream F may be made to by-pass the selective absorber, so that a fraction of the oxygen in C is left for combustion, and all combustible gas in C available for reaction. This technique may be applicable to measuring alcohol in the breath of persons suspected of drunken motoring.

So that the invention is more readily understood, attention is specifically directed to the diagrammatic drawings. In all the figures the container or duct for the sample gas S is marked number 1; the bleed channel, or channels, is 2; the analyzer E is 3; the diluent carrier gas C present in several components is not numbered. In all figures S should be thought of as either stationary or flowing.

FIGS. 1 and 2 illustrate the principle of dilution systems with stationary C, and with E destroying all X in the process of analysis. S and C communicate through pipes 14 and 24. In FIG. 1 the horizontal part of 14 contains an oil drop 15 or the like as a mobile liquid seal. In FIG. 2 and absorber 25 takes the place of the seal. The absorber is selective for X and prevents the ingress of X from S into C through 24. To cite an application of these systems, oxygen in gases up to a concentration of 100% can be analyzed using a trace sensor for oxygen which is linearly responsive up to only 0.001%.

FIG. 3 shows C recirculated by a pump 36. In this case E need not destroy X. Instead, X is completely retained in the absorber 37. S and C communicate via the U-shaped pipe 34 with a small volume of liquid 35, such as oil, in its lowest part, to act, this time not as a seal, but as a vent, preventing differences of total pressures between S and C from arising through temperature fluctuations. It will be noted that the liquid in the U-bend is quite shallow so that if slightly pushed aside by excess pressure, a path is opened immediately, but temporarily, for gas to pass along the inner curvature of the bend, sufficient for equalizing the pressure. The analyzer 3 is so positioned that any X entering C through 35 does not affect 3 and is absorbed in 37. This system, like those of FIGS. 1 and 2, is applicable to the analysis of oxygen as a major constituent with an analyzer otherwise only usable for traces. Since in this case 3 does not necessary act as an absorber for X, 3 and the surrounding "dead" space can be made small in dimensions, which benefits the speed of response.

Figure 3:
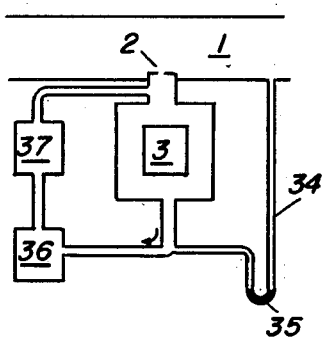
Figure 4:
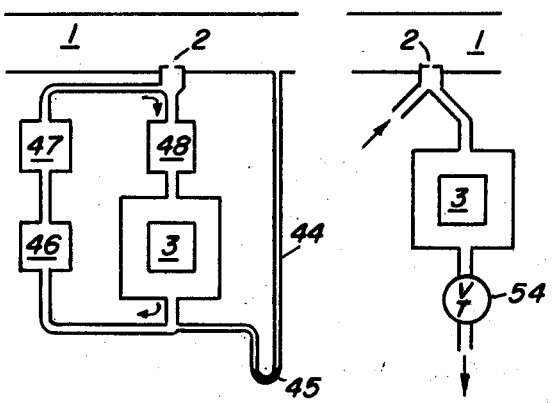
FIG. 4 represents a system which operates as the one of FIG. 3 except that X is analyzed indirectly, after undergoing a chemical reaction in reactor zone 48. An application is the analysis of carbon monoxide in producer gas mentioned earlier, with iodine pentoxide as reactant in 48, and with an amperometric iodine sensor as 3.
Figure 5:
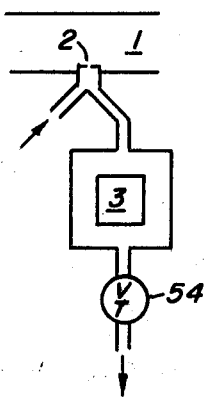
FIG. 5 shows the use of flowing C with a slight excess pressure over S created by a throttle 54, which adjusts the dilution ratio.

Returning to FIGS. 3 and 4, a throttle may be inserted in these systems, where C recirculates, preferably immediately after 3. The small loss of gas from C through 2 into S is then automatically made up by an equal ingress of gas from S into C through 35 and 45. The X so introduced into C does not affect the analyzer. The analyzer receives, in fact, less X than without throttling. By suitable positioning of the throttle and vent, the opposite effect can also be obtained. Also, where S is flowing, pressure differentials can be created by flow restrictions inserted into S instead of into C.

Figure 6:
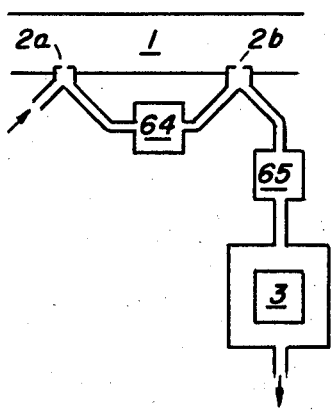

FIG. 6 is best explained by reference to one application, the determination of a small percentage of hydrogen in air. In this case C is nitrogen. The bleed 2a picks up both hydrogen and oxygen from the air sample. The oxygen could be used to combust the hydrogen and the oxygen consumed, equivalent to the hydrogen, could be determined as a different using a trace oxygen analyzer. However, as a rule the oxygen bleed is too much in excess over the hydrogen bleed for this procedure to be precise. The oxygen is, therefore, removed in absorber 64, and a smaller quantity of oxygen (together with some hydrogen) is introduced by a second, smaller bleed 2b. Combustion is effected over the hot catalyst 65 and the relatively small amount of residual oxygen is analyzed in 3.

Figure 7:
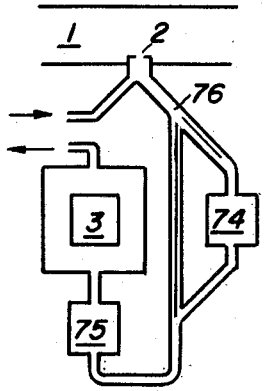

FIG. 7 may be explained by the same example, determination of hydrogen in air. The diluent stream C carrying hydrogen and oxygen, both picked up at bleed 2, splits at fork 76. The major portion of C flows through the absorber bed 74 which retains oxygen but not hydrogen. A minor portion of C by-passes the absorber. Thus the combustion zone 75 receives all hydrogen but only a moderate excess of oxygen. Again, after combustion, the oxygen left over is measured in 3, and the signal obtained deducted from the signal obtained when the combustion zone is cold. The difference measures the hydrogen. Organic vapors in air can be measured similarly.

Figure 1:
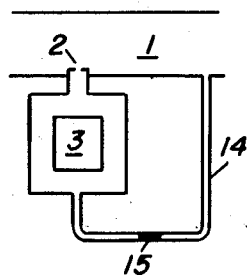
Figure 2:
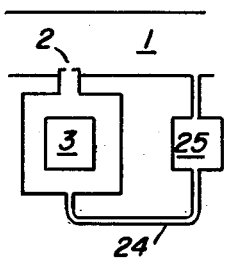
Figure 8:
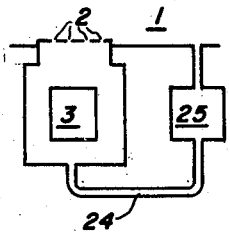

FIG. 8 illustrates the use of a plurality of channels 2 for samples already highly dilute in X, but needing further dilution. Otherwise this version of the invention operates as the one illustrated in FIG. 2.

Other modes of applying the present invention may be employed, change being made as regards the details described, provided the features stated in any of the following claims or the equivalent of such be employed.

I, therefore, particularly point out and distinctly claim as my invention:

1. The method of diluting a sample gas for analysis which comprises diffusing a portion of said gas into a diluent carrier gas through a bleed, said bleed comprising at least one channel no wider than about 0.01 square millimeter in cross section and being from about 0.01 to about 5 mm. in length, the total pressures of said sample gas and said carrier gas being substantially equal.

2. The method of continuously analyzing a sample gas which comprises diluting said sample gas with a carrier gas to a ratio of from about 1:5000 to about 1:500,000 by diffusing a substantially small portion of said sample through a bleed where said portion is picked up by a diluent carrier gas flowing past the opposite end of said bleed to an analyzing means, said bleed comprising at least one channel having a cross section of no more than about 0.01 square millimeter in area and being from about 0.01 to about 5 mm. in length, and the total pressures of said sample gas and said carrier gas being substantially equal, carrying said sample portion to an analysis means and analyzing said sample portion.

3. The method of claim 2 where the diluent carrier gas picks up the sample gas and carries the sample portion to analyzing means then to an absorbing means whereby any portion remaining after analysis is retained and then returning said diluent carrier gas past said bleed channel.

4. The method of continuously analyzing a sample gas which comprises diluting said sample gas with a carrier gas to a ratio of from about 1:5000 to about 1:500,000 by diffusing a substantially small portion of said sample through a bleed where said portion is picked up by a diluent carrier gas at the opposite end of said bleed, maintaining a differential of total pressure of not more than about 20 mm. of mercury between said portion of sample gas and said diluent carrier gas, said bleed comprising at least one channel having a cross section of no more than about 0.01 square millimeter in area and being from about 0.01 to about 5 mm. in length, carrying said sample portion to an analysis means and analyzing said sample portion.

5. The method of claim 4 where said carrier gas is flowing continuously past said bleed.

6. The method of claim 1 where said bleed comprises a plurality of channels, each channel having a cross section of no more than about 0.01 square millimeter in area and being from about 0.01 to about 5 mm. in length.

7. The method of claim 2 where said bleed comprises a plurality of channels each channel having a cross section of no more than about 0.01 square millimeter in area and being from about 0.01 to about 5 mm. in length.

8. The method of claim 4 whereby the diffusion of the sample gas across the bleed is adjusted by a minute flow of gas across the bleed, which flow is not necessarily in the same direction as the diffusion.

9. In an apparatus for taking gas samples and diluting a portion of said gas sample with a carrier gas prior to analysis, the improvement which consists of a bleed in the wall of said apparatus separating said gas sample from said carrier gas, said bleed comprising at least one channel no wider than about 0.01 square millimeter in cross section and being from about 0.01 to about 5 mm. in length, and means for maintaining said gas sample and said carrier gas at substantially the same pressure.

10. The apparatus of claim 9 in which said bleed comprises a plurality of channels, each channel having a cross section of no more than about 0.01 square millimeter in area and being from about 0.01 to about 5 mm. in length.

11. In an apparatus for taking gas samples and diluting a portion of said gas sample with a carrier gas prior to analysis, the improvement which consists of a bleed in the wall of said apparatus separating said gas sample from said carrier gas, said bleed comprising at least one channel no wider than about 0.01 square millimeter in cross section and being from about 0.01 to about 5 mm. in length, and means for maintaining across said bleed a pressure differential or not more than about 20 mm. of mercury.

12. The apparatus of claim 11 in which said means maintains the pressure of said gas sample inferior to that of said carrier gas.

13. The apparatus of claim 11 in which said means maintains the pressure of said gas sample superior to that of said carrier gas.

References Cited by the Examiner

UNITED STATES PATENTS

| | | | |
|---|---|---|---|
| 2,045,379 | 6/36 | Bennett | 73—23 |
| 2,561,414 | 7/51 | Potts | 73—23 |
| 2,787,903 | 4/57 | Beard | 73—23 |
| 2,981,091 | 4/61 | Roberts | 73—1 |
| 2,991,647 | 7/61 | Harris | 73—23 |

OTHER REFERENCES

Articles entitled "Two-Stage Gas-Liquid Chromatography" by M. C. Simmons et al., Analytical Chemistry, vol. 30, No. 1, January 1958, pp. 32–35.

RICHARD C. QUEISSER, *Primary Examiner.*

ROBERT L. EVANS, JOSEPH P. STRIZAK, *Examiners.*